US012592091B2

(12) United States Patent
Markhasin et al.

(10) Patent No.: US 12,592,091 B2
(45) Date of Patent: Mar. 31, 2026

(54) IMAGE AND VIDEO PROCESSING CIRCUITRY AND METHOD USING AN IMAGE SIGNATURE

(71) Applicant: Sony Semiconductor Solutions Corporation, Atsugi (JP)

(72) Inventors: Lev Markhasin, Stuttgart (DE); Stephen Tiedemann, Stuttgart (DE); Stefan Uhlich, Stuttgart (DE); Bi Wang, Stuttgart (DE)

(73) Assignee: SONY SEMICONDUCTOR SOLUTIONS CORPORATION, Atsugi (JP)

( * ) Notice: Subject to any disclaimer, the term of this patent is extended or adjusted under 35 U.S.C. 154(b) by 434 days.

(21) Appl. No.: 18/015,088

(22) PCT Filed: Jul. 8, 2021

(86) PCT No.: PCT/EP2021/068987
§ 371 (c)(1),
(2) Date: Jan. 9, 2023

(87) PCT Pub. No.: WO2022/013056
PCT Pub. Date: Jan. 20, 2022

(65) Prior Publication Data

US 2023/0252808 A1      Aug. 10, 2023

(30) Foreign Application Priority Data

Jul. 15, 2020    (EP) ..................................... 20186048

(51) Int. Cl.
*G06V 20/70* (2022.01)
*G06T 1/00* (2006.01)
*G06V 10/764* (2022.01)
*H04L 9/00* (2022.01)

(52) U.S. Cl.
CPC ............ *G06V 20/70* (2022.01); *G06T 1/0021* (2013.01); *G06V 10/764* (2022.01); *H04L 9/50* (2022.05); *G06T 2201/005* (2013.01)

(58) Field of Classification Search
None
See application file for complete search history.

(56) References Cited

U.S. PATENT DOCUMENTS

| 2006/0020830 A1 | 1/2006 | Roberts |
| 2009/0256972 A1 | 10/2009 | Ramaswamy et al. |
| 2018/0288362 A1 | 10/2018 | Altenburger et al. |
| 2019/0370286 A1 | 12/2019 | Bertsch et al. |

FOREIGN PATENT DOCUMENTS

WO        2020/044052 A1      3/2020

OTHER PUBLICATIONS

International Search Report and Written Opinion mailed on Oct. 19, 2021, received for PCT Application PCT/EP2021/068987, filed on Jul. 8, 2021, 9 pages.

(Continued)

*Primary Examiner* — Lennin R Rodriguezgonzalez
(74) *Attorney, Agent, or Firm* — XSENSUS LLP

(57) ABSTRACT

An image processing circuitry configured to: generate, based on obtained image data, a visual content word sequence indicative for a visual content of an image represented by the obtained image data; and generate, based on the generated visual content word sequence, an image signature for the image.

20 Claims, 9 Drawing Sheets

(56) References Cited

OTHER PUBLICATIONS

Xu et al., "Show, Attend and Tell: Neural Image Caption Generation with Visual Attention", arXiv:1502.03044v3, [cs.LG], Apr. 19, 2016, 22 pages.

Hossain et al., "A Comprehensive Survey of Deep Learning for Image Captioning", ACM Computing Surveys, arXiv:1810.04020v2 [cs.CV], Oct. 14, 2018, pp. 0:1-0:36.

Bhattacharjee et al., "Compression Tolerant Image Authentication", IEEE, Proceedings 1998 International Conference on Image Processing. ICIP98 (Cat. No.98CB36269), Available Online At: https://ieeexplore.IEEE.org/ abstract/document/723518, Oct. 7, 1998, pp. 435-439.

Wang et al., "A Visual Model-Based Perceptual Image Hash for Content Authentication", IEEE Transactions on Information Forensics and Security, vol. 10, No. 7, Available Online At: https://ieeexplore.ieee.org/document/7050251, Jul. 2015, pp. 1336-1349.

Lin et al., "A Robust Image Authentication Method Distinguishing JPEG Compression from Malicious Manipulation", IEEE Transactions on Circuits and Systems of Video Technology, vol. 11, No. 2, Feb. 2001, Available Online At: https://ieeexplore.ieee.org/document/905982, pp. 153-168.

Wang et al., "An Overview of Image Caption Generation Methods", Computational Intelligence and Neuroscience, vol. 2020, Article ID 3062706, Available Online At: https://downloads.hindawi.com/journals/cin/2020/3062706.pdf, Jan. 9, 2020, pp. 1-13.

1c
4c
"Cat eats ice-cream in birthday hat under cloudy sky"

1d
4d
"Cat eats ice-cream in birthday hat with a dog in birthday hat under cloudy sky"

1e
4e
"Cat eats ice-cream in birthday hat under cloudy sky"

1f
4f
"Cat eats ice-cream in birthday hat"

100

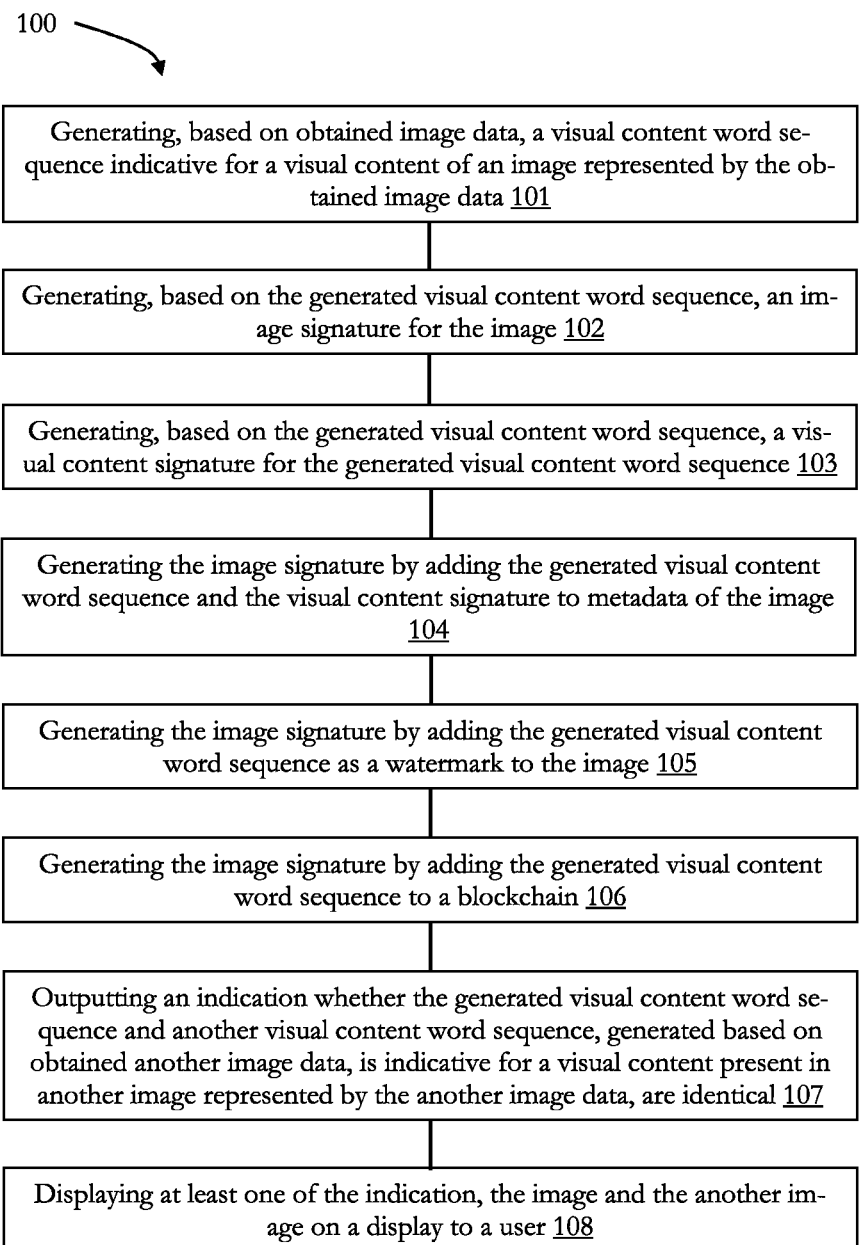

Generating, based on obtained image data, a visual content word sequence indicative for a visual content of an image represented by the obtained image data 101

Generating, based on the generated visual content word sequence, an image signature for the image 102

Generating, based on the generated visual content word sequence, a visual content signature for the generated visual content word sequence 103

Generating the image signature by adding the generated visual content word sequence and the visual content signature to metadata of the image 104

Generating the image signature by adding the generated visual content word sequence as a watermark to the image 105

Generating the image signature by adding the generated visual content word sequence to a blockchain 106

Outputting an indication whether the generated visual content word sequence and another visual content word sequence, generated based on obtained another image data, is indicative for a visual content present in another image represented by the another image data, are identical 107

Displaying at least one of the indication, the image and the another image on a display to a user 108

Fig. 8

200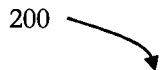

Extracting, from obtained audio data, a speech word sequence indicative
for spoken words in an audio track represented by the obtained audio
data, wherein the obtained audio data is audio data associated with a pre-
determined number of consecutive images of corresponding video data
201

Generating, based on the speech word sequence, one image signature for
the predetermined number of consecutive images 202

Generating the one image signature by at least one of: adding the ex-
tracted speech word sequence to metadata of each of the predetermined
number of consecutive images, adding the extracted speech word se-
quence as a watermark to each of the predetermined number of consecu-
tive images, and adding the extracted speech word sequence to a
blockchain 203

Generating, based on obtained image data, a visual content word se-
quence for each of the predetermined number of consecutive images
represented by the obtained image data, wherein the visual content word
sequence is indicative for a visual content of the respective image 204

Generating, based on the respective generated visual content word se-
quence, another image signature for the respective image 205

Generating the another image signature for each of the predetermined
number of consecutive images by at least one of: adding the respective
generated visual content word sequence to metadata of the respective
image, adding the respective generated visual content word sequence as a
watermark to the respective image, and adding the respective generated
visual content word sequence to a blockchain 206

Fig. 11

IMAGE AND VIDEO PROCESSING CIRCUITRY AND METHOD USING AN IMAGE SIGNATURE

CROSS-REFERENCE TO RELATED APPLICATIONS

The present application is based on PCT filing PCT/EP2021/068987, filed Jul. 8, 2021, and claims priority to EP Application Serial No. 20186048.3, filed Jul. 15, 2020, the entire contents of each are incorporated herein by reference.

TECHNICAL FIELD

The present disclosure generally pertains to an image processing circuitry and corresponding image processing method, and a video processing circuitry and corresponding video processing method.

TECHNICAL BACKGROUND

Generally, deep neural networks (DNNs) are known, such as a generative adversarial network, which allow generating an image or a video by a computer that may appear as a real image or a real video to the humans' eye.

Moreover, DNNs allow modifying real images or real videos by, for example, introducing, exchanging or manipulating parts of the real images or the real videos by a computer. These manipulations may be difficult to recognize for humans even though they are entirely artificial.

These deepfakes and visual/audio manipulation techniques may undermine the humans' trust in the realness of an image or video. People may no longer be sure about the origin of an image and whether the image has been captured with a real image sensor.

Generally, electronic signatures for images generated based on the image pixel values are known, however, the image signatures may be different after processing the images.

Although there exist techniques for electronic signatures for an image, it is generally desirable to improve the existing techniques.

SUMMARY

According to a first aspect the disclosure provides an image processing circuitry configured to: generate, based on obtained image data, a visual content word sequence indicative for a visual content of an image represented by the obtained image data; and generate, based on the generated visual content word sequence, an image signature for the image.

According to a second aspect the disclosure provides a video processing circuitry configured to: extract, from obtained audio data, a speech word sequence indicative for spoken words in an audio track represented by the obtained audio data, wherein the audio track is associated with a predetermined number of consecutive images of a corresponding video; and generate, based on the speech word sequence, one image signature for the predetermined number of consecutive images.

According to a third aspect the disclosure provides an image processing method comprising:

generating, based on obtained image data, a visual content word sequence indicative for a visual content of an image represented by the obtained image data; and generating, based on the generated visual content word sequence, an image signature for the image.

According to a fourth aspect the disclosure provides a video processing method comprising:

extracting, from obtained audio data, a speech word sequence indicative for spoken words in an audio track represented by the obtained audio data, wherein the audio track is associated with a predetermined number of consecutive images of a corresponding video; and generating, based on the speech word sequence, one image signature for the predetermined number of consecutive images.

Further aspects are set forth in the dependent claims, the following description and the drawings.

BRIEF DESCRIPTION OF THE DRAWINGS

Embodiments are explained by way of example with respect to the accompanying drawings, in which:

FIG. 8 schematically illustrates in a flow diagram an embodiment of an image processing method;

FIG. 11 schematically illustrates in a flow diagram an embodiment of a video processing method.

DETAILED DESCRIPTION OF EMBODIMENTS

Figures 3, 4:
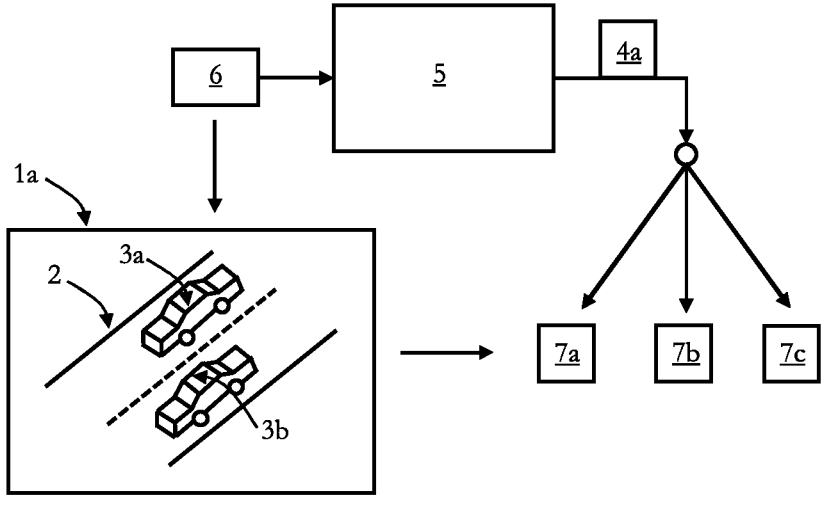
FIG. 3 schematically illustrates in a block diagram a first embodiment of an image processing circuitry.
FIG. 4 schematically illustrates embodiments of visual content word sequences for images.

Before a detailed description of the embodiments under reference of FIG. 3 is given, general explanations are made.

As mentioned in the outset, deep neural networks (DNNs) are known, such as a generative adversarial network, which allow generating an image or a video by a computer that may appear as a real image or a real video to the humans' eye.

Moreover, DNNs allow modifying real images or real videos by, for example, introducing, exchanging or manipulating parts of the real images or the real videos by a computer. These manipulations may be difficult to recognize for humans even though they are entirely artificial.

These deepfakes and visual/audio manipulation techniques may undermine the humans' trust in the realness of an image or video. People may no longer be sure about the origin of an image and whether the image has been captured with a real image sensor.

As further mentioned in the outset, electronic signatures for images generated based on the image pixel values are known, however, the image signatures may be different after processing the images, for example, after compressing, cropping or resizing the image, the image signature may be different than before.

Generally, the image signature is a mathematical concept which may have characteristics difficult to be verified by a human operator.

Hence, it has been recognized that it is desirable to provide an image signature that is robust to at least some image processing methods and whose authenticity may be easily verified by a human operator.

Consequently, some embodiments pertain to an image processing circuitry configured to generate, based on obtained image data, a visual content word sequence indicative for a visual content of an image represented by the obtained image data and to generate, based on the generated visual content word sequence, an image signature for the image.

The image processing circuitry may be included or may be part of an image processing device such as a camera, a mobile device, e.g., a smartphone including an imaging module, a video camera (e.g. camcorder) or the like.

The image processing circuitry may be based on or may include or may be implemented by typical electronic components configured to achieve the functionality as described herein.

The image processing circuitry may be based on or may include or may be implemented as integrated circuitry logic and the functionality may be implemented by software executed by a processor or the like. The image processing circuitry may be based on or may include or may be implemented by a CPU (central processing unit), a micro-controller, an FPGA (field programmable gate array), an ASIC (application specific integrated circuit) or the like.

The image processing circuitry may be based on or may include or may be implemented in parts by typical electronic components and integrated circuitry logic and in parts by software.

The image processing circuitry may include an image sensor for generating image data representing an image. The image sensor may include a pixel circuitry (control, timing, driving units, signal processing, etc.) having a plurality of pixels (arranged according to a predetermined pattern, e.g., in rows and columns in the image sensor) generating an electric signal in accordance with an amount of light inci-dent onto each of the plurality of pixels.

The image data is data generated by an image sensor in accordance with an amount of light incident onto the image sensor. The image data represents an (real) image captured with an image processing device such as a camera. The image data may be based on or may include digital values obtained from an analog signal (electric signal) generated by a plurality of pixels in accordance with the amount of light incident on each of the plurality of pixels. The image data may be obtained from the image sensor or may be obtained from a memory or the like.

The visual content word sequence includes a plurality of words. The plurality of words may be arranged, for instance, as a sentence, a phrase or the like. The visual content word sequence may be based on digital values representing the plurality of words. Generally, the words be in any language, e.g. English, Japanese, Chinese, French, Spanish, German, etc. In some embodiments, corresponding word sequences in different languages are provided.

The visual content word sequence is indicative for a visual content of an image represented by the obtained image data.

The visual content is basically the content of a scene shown on the image that is visually perceived. For example, the scene shown on the image may contain objects, persons, animals, a landscape and the like and, thus, the visual content of the image includes, for example, the objects, the persons, the animals, the landscape and the like. Moreover, the visual content may include associations between ele-ments included in the visual content, for example, the positional arrangement of the objects and the persons, inter-actions between them, activities and gestures of the persons and the like.

Hence, the plurality of words includes, for example, the words representing the objects, persons, animals, the land-scape and the like included in the visual content. The plurality of words may include the words representing the associations between elements of the visual content.

This kind of (high-level) information extracted from an image may be robust against at least some image processing methods, for instance, gray scaling or resizing of the image will not change, e.g., the visually perceived objects and persons.

Moreover, as the visual content word sequence is indica-tive for the visual content of an image and understandable by a human, it may be verified quickly by a human operator whether the image has been manipulated by simply watch-ing the image and comparing it to the visual content word sequence, since the human operator may easily grasp the visual content of the image.

Accordingly, the image processing circuitry generates, based on the generated visual content word sequence, an image signature for the image.

Figure 1:
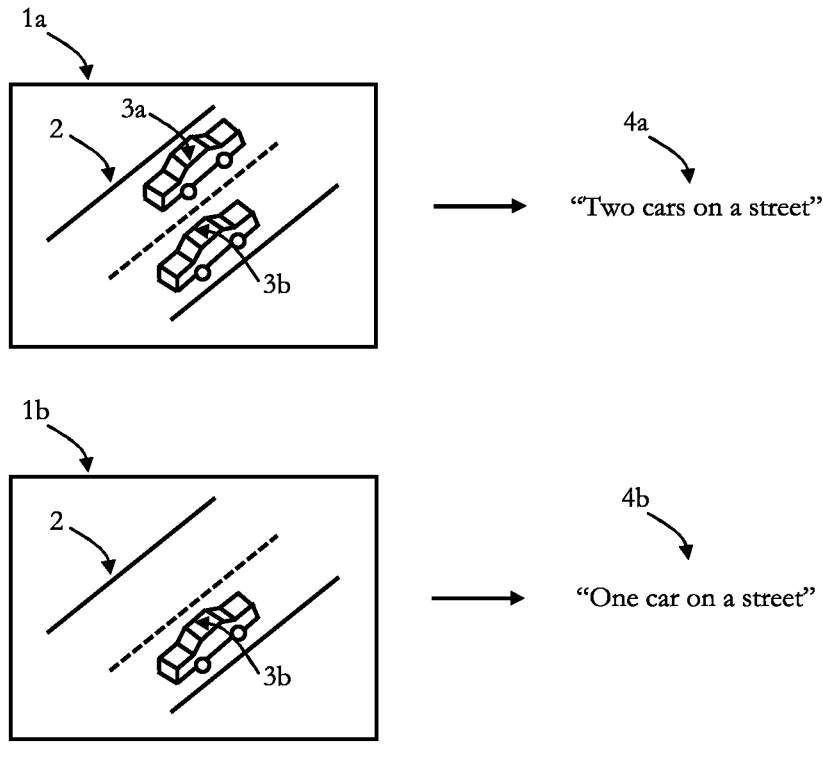
FIG. 1 schematically illustrates embodiments of visual content word sequences for images.

Before different embodiments of generating an image signature are discussed, more generally, embodiments of visual content word sequences are discussed under reference of FIG. 1, wherein the following explanation is generally applicable in the present disclosure also to other embodi-ments.

The upper part of FIG. 1 shows schematically a first image 1a showing a scene of a street 2 on which two cars 3a and 3b are driving.

Thus, the generated visual content word sequence 4a is "two cars on a street", which is indicative for the visual content of the first image 1a.

If the first image 1a is manipulated and the car 3a is removed from the first image 3a, exemplary the second image 1b is obtained.

For the second image 1b a different visual content word sequence 4b is generated, since only one car 3b is shown on the image 1b.

Hence, a user would be able to immediately recognize the manipulation of the image 1a, which is shown in image 1b, when he gets the information "Two cars on a street", i.e. visual content word sequence 4a, since this does not fit to the visual content of image 1b.

Generally, the visual content of an image (e.g. objects and persons in the image) may be extracted by performing image analysis implemented based on, for example, a neural net-work (e.g. a convolutional neural network classifying objects or a captioning network) which are known in object detection. Depending on the depth of feature analysis (e.g. at first a person may be detected, then the person may be detected as a woman or a man, then gestures may be detected, etc.) and a relation of the resulting features to other objects or persons (e.g. based on a positional relation, gestures, etc.) associations between them may be (automati-cally) extracted. Based on these associations the visual content of the image may be (automatically) extracted in large detail and, thus, it is possible to (automatically) generate a visual content word sequence that is indicative for the visual content.

For enhancing the general understanding of the present disclosure, under reference of FIG. 2, more generally, embodiments for a basic implementation of the functionality of generating a visual content word sequence for an image based on neural networks are discussed in the following, wherein this basic implementation can be implemented in other embodiments of the present disclosure.

In some embodiments, a classification neural network is used, wherein the classification neural network may be trained on a (very big) dataset containing examples of a wide variety of objects that may be shown on an image.

Moreover, the classification neural network should be deployable on an edge device, since the visual content word sequence should be generated at the time of capturing the image.

Figure 2:
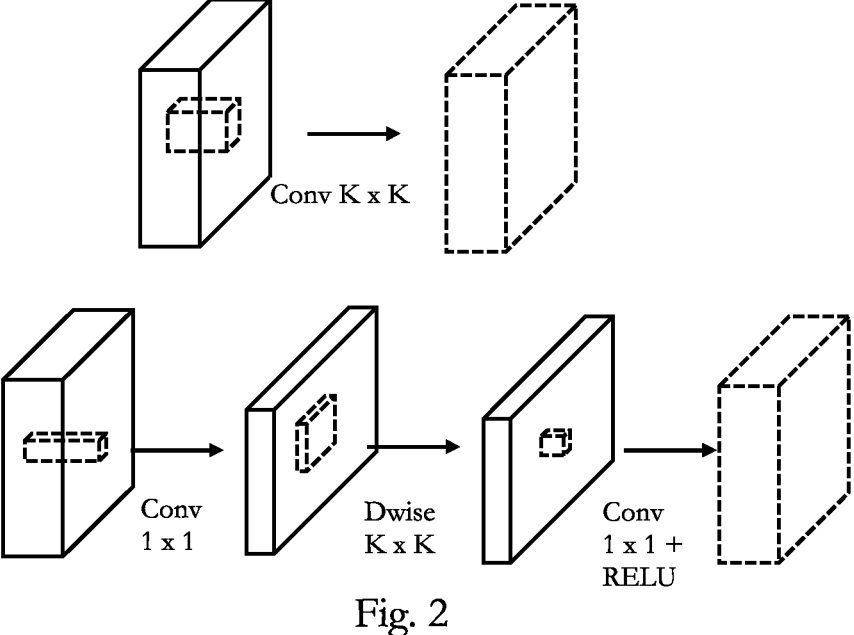
FIG. 2 schematically illustrates in a block diagram in the upper part an embodiment of a K×K convolutional block and in the lower part an embodiment of a CP convolutional block.

Typically, as illustrated schematically in block diagram in the upper part of FIG. 2, when convolutional neural networks are used for object classification in some embodiments, big kernels like 3×3, 5×5, etc. may be used in convolutional layers (Conv K×K).

However, for a convolutional network to be deployable on an edge device (e.g. mobile device), big kernels may be computationally too expensive due to the limited computing resources on the edge device.

Therefore, in some embodiments, the classification neural network is based on either 1×1 convolutions (kernels, Conv 1×1) or so-called depthwise convolutions (Dwise K×K). In such embodiments, fixed blocks are created, and the network architecture is constructed of such blocks, as generally known.

The blocks may be, for example, inverted residual blocks or CP convolutional blocks (convolution pooling block), wherein a CP convolutional block is exemplarily and schematically illustrated in a block diagram the lower part of FIG. 2.

In such embodiments, any combination of such blocks provides a neural network for object classification.

In some embodiments, no fully connected layers are used at the end of the classification neural network but either so-called global average pooling layers or global depthwise convolutional layers that calculate averages of final feature maps.

In some embodiments, the classification neural network ends in a softmax layer.

In such embodiments, the classification neural network outputs probabilities for all objects to be contained in the image. The classification may be based on either the 10 (or other number) objects with the highest softmax score or based on all objects whose score is above a certain threshold.

In some embodiments, in an image verification process more objects are allowed than for an image signature generation (or lower threshold). In such embodiments, a certain number (e.g. 10) out of it (e.g., like 10 objects out of 15). Typically, as generally known, classification networks are sufficiently reliable and usually robust and, thus, allowing for 10 out of 15 may eliminate errors.

In some embodiments, a detection head and bounding boxes replace the softmax layer.

In some embodiments, the classification neural network is based on a captioning network that takes image data as input and provides a caption for the corresponding image, i.e. a text describing the content of the image (visual content word sequence).

In some embodiments, the captioning network is based on an encoder-decoder style network, wherein the encoder encodes the image while the decoder decodes into text.

In some embodiments, the encoder is based on an image classification network as backbone while the decoder is based on an LSTM (long short-term memory) network as a language model.

Returning to the general explanations, in some embodiments, the image processing circuitry is further configured to generate, based on the generated visual content word sequence, a visual content signature for the generated visual content word sequence, and wherein the image signature is generated by adding the generated visual content word sequence and the visual content signature to metadata of the image.

The visual content signature is generated based on the generated visual content word sequence by calculating, for example, a hash key or the like from the (arranged) plurality of words for uniquely identifying the generated visual content word sequence. This may provide a further level of security, since the same visual content word sequence must produce the same hash key.

Both the visual content signature and the generated visual content word sequence are added to the metadata of the image, thereby generating the image signature for the image.

As generally known, in some embodiments, the metadata of an image is text information pertaining to an image file including details relevant to the image itself as well as information about its production. It may be embedded into the image file or may be contained in a separate file associated with the image file.

This may provide a cheap protection with relatively weak binding between the image and the image signature included in the metadata.

In some embodiments, the image signature is generated by adding the generated visual content word sequence as a watermark to the (obtained) image (data).

As also generally known, in some embodiments, the (digital) watermark is a marker covertly embedded in, e.g., image or video data which may be used to verify authenticity or integrity.

Embedding a watermark may thus provide a strong binding between the image and its visual content description (visual content word sequence). In some embodiments, the watermark visually impairs the image.

In some embodiments, the image signature is generated by adding the generated visual content word sequence to a blockchain.

As generally known, in some embodiments, the blockchain is a decentralized, distributed digital ledger of a growing list of records (blocks) that is used to record transactions across many computers. Each block holds batches of valid transactions and their timestamp, wherein the transactions are hashed and encoded, e.g., in a Merkle tree, in some embodiments, and each block contains the hash of the prior block for linking them so that the linked blocks form a chain.

Basically, any blockchain may be used for storing the generated visual content word sequence (transaction), for example, IOTA™ tangle may be used.

In some embodiments, when an image is captured the (copy of) visual content word sequence is added to the blockchain associated with the image, for example, based on the timestamp, thereby generating the image signature for the image. By using the blockchain manipulations may be difficult to achieve.

In some embodiments, the image processing circuitry is further configured to output an indication whether the generated visual content word sequence and another visual content word sequence, generated based on obtained another image data, indicative for a visual content of another image represented by the another image data, are identical.

In some embodiments, when an (another) image has to be verified for authenticity, the another image data is input and the visual content word sequence for that image is extracted. In such embodiments, this generated another visual content word sequence is compared to the (previously) generated visual content word sequence of an image which may be an original version of the another image (e.g. before image processing or the like).

In such embodiments, an indication of the comparison result is generated and output. The indication may be processed and in response to processing the indication a user may be notified.

Hence, in some embodiments, at least one of the indication, the image together with the generated visual content word sequence and the another image together with the another visual content word sequence is displayed on a display to a user.

As discussed above, the user may quickly grasp the visual content of the displayed images and may easily verify whether the corresponding visual content word sequences match to the images or not, thereby detecting manipulations in the image.

Some embodiments pertain to an image processing method including: generating, based on obtained image data, a visual content word sequence indicative for a visual content of an image represented by the obtained image data, and generating, based on the generated visual content word sequence, an image signature for the image.

The image processing method may be based on or may be implemented by electronic components, integrated circuitry logic, CPU, FPGA, software or in parts by electronic components and in parts by software executed by a processor or the like.

The image processing may be extended to video processing by processing, for example, the image of every frame of the video according to the methods as discussed herein for a single image.

Moreover, an audio track/audio data of the video which is acquired, for example, in parallel and associated with the images captured in frames (as generally known for videos), may be processed in order to generate on the one hand a signature for the images corresponding to the audio track and on the other hand generate a signature for the audio track itself.

Consequently, some embodiments pertain to a video processing circuitry configured to extract, from obtained audio data, a speech word sequence indicative for spoken words in an audio track represented by the obtained audio data, wherein the audio track is associated with a predetermined number of consecutive images of a corresponding video, and generate, based on the speech word sequence, one image signature for the predetermined number of consecutive images.

The video processing circuitry may be included or may be part of a video processing device such as a video camera, a mobile device, e.g., a smartphone able to capture videos, or the like.

The video processing circuitry may be based on or may include or may be implemented by typical electronic components configured to achieve the functionality as described herein.

The video processing circuitry may be based on or may include or may be implemented as integrated circuitry logic and the functionality may be implemented by software executed by a processor or the like. The video processing circuitry may be based on or may include or may be implemented by a CPU (central processing unit), a microcontroller, an FPGA (field programmable gate array), an ASIC (application specific integrated circuit) or the like.

The video processing circuitry may be based on or may include or may be implemented in parts by typical electronic components and integrated circuitry logic and in parts by software.

The video processing circuitry may include an image sensor for generating image data representing an image. The image sensor may include pixel circuitry (control, timing, driving units, signal processing, etc.) having a plurality of pixels (arranged according to a predetermined pattern, e.g., in rows and columns in the image sensor) generating an electric signal in accordance with an amount of light incident onto each of the plurality of pixels. The image data may be based on or may include digital values obtained from an analog signal (electric signal) generated by the plurality of pixels.

The video processing circuitry may include a microphone or a sound sensor or the like configured to acquire audio data representing an audio track of the video.

The audio data is generated by a microphone or a sound sensor and represents an audio track of a video. The audio data may be obtained from the microphone or the sound sensor or from a memory or the like. The audio data may be based on or may include digital values obtained from an analog signal generated by the microphone or the sound sensor in accordance with sound waves and the like.

Generally, a video represented by video data consists of consecutive images represented by image data captured in frames according to a frame rate and consists of an audio track represented by audio data acquired in parallel to the image data.

Thus, each part of the audio track is associated with a predetermined number of consecutive images of the corresponding video. In other words, the video may be divided, for example, in snippets or video sequences of 10 seconds, so that a 10 second part of the audio track is associated with the consecutive images in that video sequence (without limiting the present disclosure to the given numbers and the skilled person will appreciate that any lengths of video sequences may be implemented).

The number of consecutive images may be predetermined due to the frame rate. For illustration purposes only, e.g., 50 frames per second in a 10 second video sequence results in 500 consecutive images (wherein not every image may be considered, e.g., only every second image or the like).

The speech word sequence includes at least one word which is extracted from the audio data and are indicative for spoken words in the audio track or which is a predetermined word. The speech word sequence may be a spoken word or a sentence of a person, a dialogue between persons, or the like. In the case that nothing is spoken in the audio track corresponding to the predetermined number of consecutive images of the corresponding video, the speech word sequence includes a predetermined word, for example, which may be indicative for background noise or the fact that nothing is spoken such as "silence", "background noise", "traffic noise", "bird chirping", "nothing spoken" or the like.

The speech word sequence may be extracted from the obtained audio data by performing audio signal analysis implemented based on, for example, a neural network which are known in speech recognition. The neural network may include or may use or may be implemented based on a natural language processing (NLP) model, which is generally known.

Based on the speech word sequence, one image signature for the predetermined number of consecutive images is generated.

In some embodiments, the one image signature is generated by at least one of:

adding the extracted speech word sequence to metadata of each of the predetermined number of consecutive images;

adding the extracted speech word sequence as a watermark to each of the predetermined number of consecutive images; and adding the extracted speech word sequence to a blockchain.

In such embodiments, the (same) extracted speech word sequence is used for generating one image signature for each of the predetermined number of consecutive images.

In some embodiments, the video processing circuitry is further configured to:

generate, based on obtained image data, a visual content word sequence for each of the predetermined number of consecutive images represented by the obtained image data, wherein the visual content word sequence is indicative for a visual content of the respective image; and generate, based on the respective generated visual content word sequence, another image signature for the respective image.

In some embodiments, the another image signature for each of the predetermined number of consecutive images is generated by at least one of:

adding the respective generated visual content word sequence to metadata of the respective image;

adding the respective generated visual content word sequence as a watermark to the respective image; and adding the respective generated visual content word sequence to a blockchain.

In such embodiments, each image of the predetermined number of consecutive images is analyzed and used for generating an individual image signature for that particular image.

Hence, in such embodiments, the whole image signature of an image of the predetermined number of consecutive images includes or consists of two parts: the one image signature obtained from the speech which is the same for each of the predetermined number of consecutive images and the individual image signature generated based on the concrete image data of that particular image.

According to the embodiments as described herein, some embodiments pertain to a video processing method including: extracting, from obtained audio data, a speech word sequence indicative for spoken words in an audio track represented by the obtained audio data, wherein the obtained audio data is audio data associated with a predetermined number of consecutive images of corresponding video data, and generating, based on the speech word sequence, one image signature for the predetermined number of consecutive images.

The video processing method may be based on or may be implemented by electronic components, integrated circuitry logic, CPU, FPGA, software or in parts by electronic components and in parts by software executed by a processor or the like.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 3, which schematically illustrates in a block diagram a first embodiment of an image processing circuitry 5, the first embodiment is discussed in the following.

The image processing circuitry 5 obtains image data 6, wherein the obtained image data 6 represents the image 1a of the embodiment discussed under reference of FIG. 1.

The image processing circuitry 5 generates, based on the obtained image data 6, the visual content word sequence 4a.

Then, the image processing circuitry 5 generates an image signature for the image 1a by at least one of:

Generating, based on the generated visual content word sequence 4a, a visual content signature for the generated visual content word sequence, and adding the generated visual content word sequence 4a and the visual content signature to metadata of the image at 7a.

Adding the generated visual content word sequence 4a as a watermark to the image 1a at 7b.

Adding the generated visual content word sequence 4a to a blockchain at 7c. The generated visual content word sequence 4a added to the blockchain is associated with the image 1a based on a timestamp or the like.

FIG. 4 schematically illustrates embodiments of visual content word sequences for images.

In the upper left of FIG. 4, an image 1c is shown and the corresponding generated visual content word sequence 4c is shown below the image 1c, which is "Cat eats ice-cream in birthday hat under cloudy sky".

In the upper right of FIG. 4, an image 1d is shown which is based on the image 1c, however, in the image 1c a deepfake has been introduced by adding a dog with a birthday hat to the image 1c. The corresponding generated visual content word sequence 4d is shown below the image 1d, which is "Cat eats ice-cream in birthday hat with a dog in birthday hat under cloudy sky".

Due to the deepfake manipulations present in the image 1d, the visual content word sequences 4c and 4d are different and, thus, an indication pointing out that difference may be generated and displayed to a user for verification. The user, when notified, can check the original visual content word sequence 4c and compare it to the image 4d. The user will immediately realize that the dog is not part of the original visual content of the image 1c.

The image 1c might be processed by deblurring, cropping, compression or the like, however, the visual content word sequence 4c is robust against at least some of the image processing methods.

For example, in the lower left of FIG. 4, a cropped image 1e of the image 1c is shown. The corresponding generated visual content word sequence 4e is shown below the image 1e, which is "Cat eats ice-cream in birthday hat under cloudy sky" and, thus, the same as for the image 1c.

As long as the visual content remains the same, the visual content word sequence is the same and, thus, the visual content word sequence 4c is robust against at least some image processing methods which do not alter the visual content of the image 1c.

In contrast, in the lower right of FIG. 4, a cropped image 1*f* of the image 1*c* is shown in which the cloud is missing. The corresponding generated visual content word sequence 4*f* is shown below the image 1*f*, which is "Cat eats ice-cream in birthday hat" and, thus, it is different than for the image 1*c*.

This may result in an alarm (output an indication), since the cloudy sky is missing in the image 1*f*. Then, the user verifies that the cloudy sky is not there, since the image 1*c* has been probably cropped to obtain the image 1*f* and so it may still be considered as the original image 1*c*.

Accordingly, a method to verify authenticity of an image may be provided. If an image is manipulated in such a way that, for example, objects are added or exchanged, a conflict between the original image signature and the extracted one for comparison occurs. Nevertheless, the image may be manipulated by compression, deblurring, cropping etc. without causing any issues. The image signature may be easily verified by humans.

Figure 5:
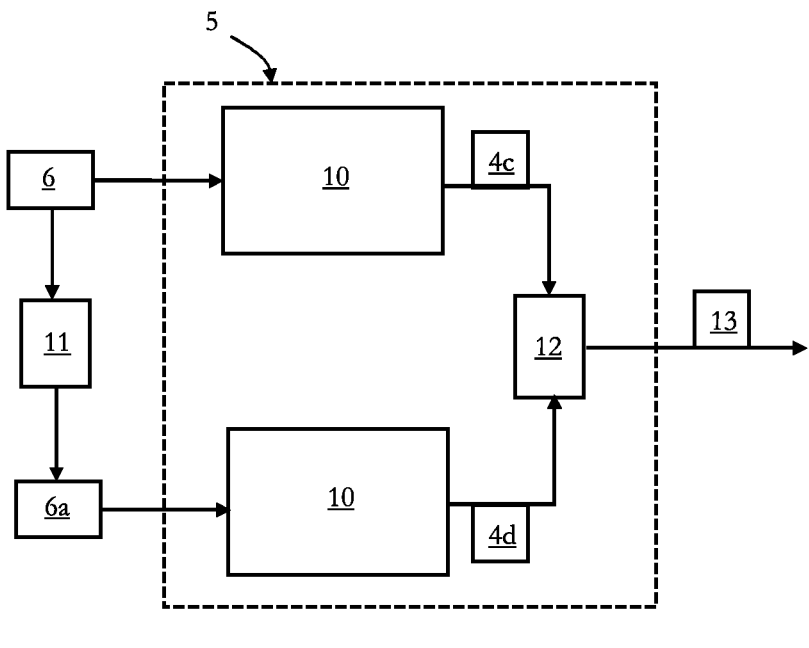
FIG. 5 schematically illustrates in a block diagram a second embodiment of an image processing circuitry.

FIG. 5 schematically illustrates in a block diagram a second embodiment of an image processing circuitry 5.

The image processing circuitry 5 is embedded in an image processing device (not shown) which is here for illustration a camera (not shown).

The image processing circuitry 5 includes a visual content extraction unit 10 (shown twice for illustration purposes only) and a comparison unit 12.

The visual content extraction unit 10 is configured to generate, based on obtained image data, a visual content word sequence indicative for a visual content of an image represented by the obtained image data.

When a user instructs the camera to capture an image of a scene, an image sensor generates image data 6 representing the image of the scene.

Then, the visual content extraction unit 10 generates a visual content word sequence 4.

The visual content word sequence 4 is used for generating an image signature (not shown) in accordance with 7*a*, 7*b* or 7*c* as discussed under reference of FIG. 3.

Accordingly, the visual content word sequence 4 is stored in association with the image (image data 6).

When the image data 6 is processed (e.g. cropping, filtering, deepfakes, or the like) by an image processing unit 11, processed image data 6' is obtained.

Then, the visual content extraction unit 10 generates a visual content word sequence 4' corresponding to the processed image data 6'.

Then, the comparison unit 12 compares both visual content word sequences 4 and 4' and outputs an indication 13 whether they are the same.

If they are different, the images represented by the image data 6 and 6' together with the visual content word sequences 4 and 4' are displayed to the user for verification.

Figure 6:
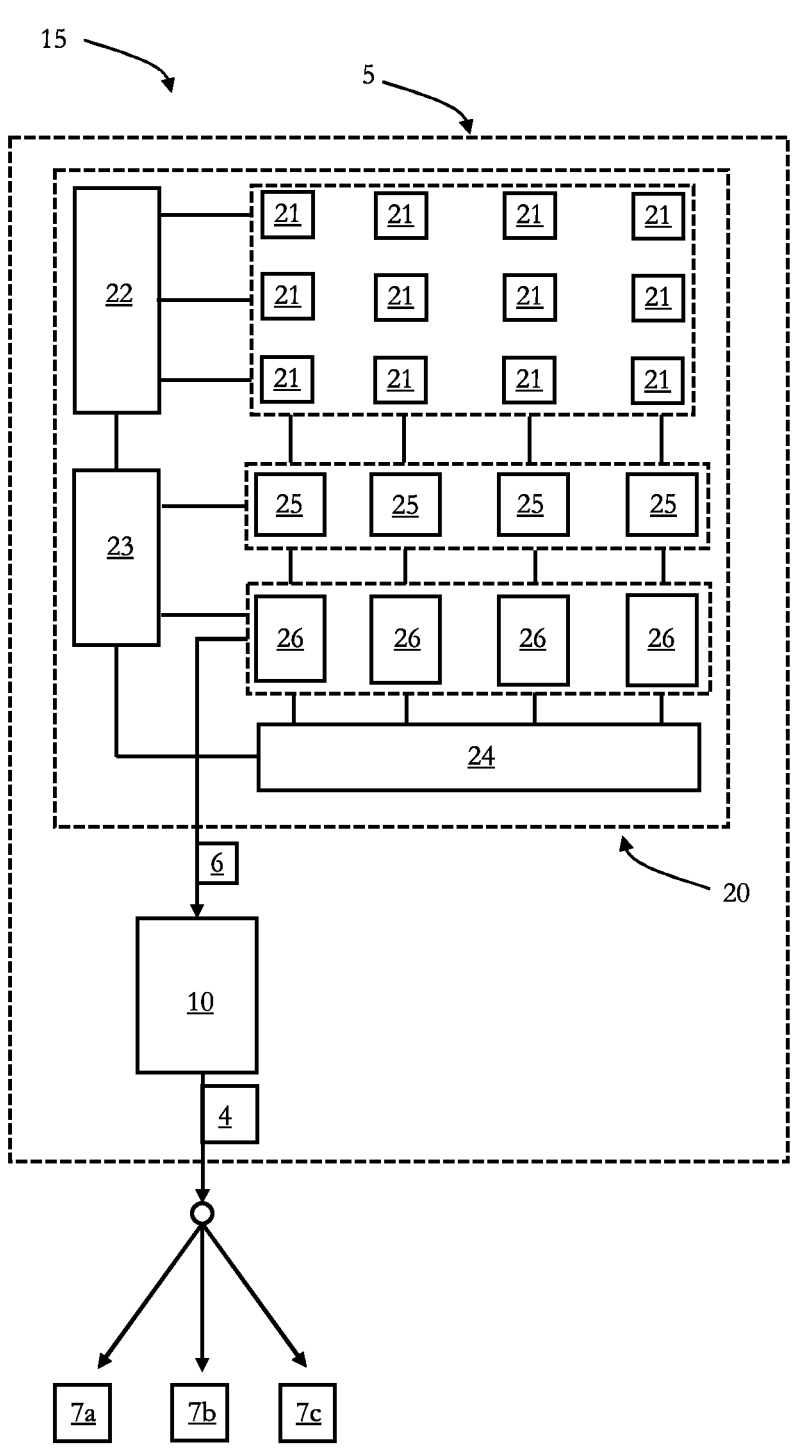
FIG. 6 schematically illustrates in a block diagram a third embodiment of an image processing circuitry.

FIG. 6 schematically illustrates in a block diagram a third embodiment of an image processing circuitry 5.

An image processing device 15, here a camera, includes an image processing circuitry 5.

The image processing circuitry 5 includes an image sensor 20 and a visual content extraction unit 10.

The image sensor 20 includes a plurality of pixels 21, a row selection logic 22, a timing control 23, a column selection logic 24, a plurality of analog signal processors 25 and a plurality of analog-to-digital (AD) converters 26.

The plurality of pixels 21 is arranged according to a predetermined pattern in rows and columns, each pixel of the plurality of pixels 21 generating an electric signal in accordance with an amount of light incident onto the respective pixel.

The row selection logic 22 selects a row of pixels 21 to output the electric signal to the plurality of analog signal processors 25.

The timing control 23 controls the timing of the row selection logic 22, the column selection logic 24, the plurality of analog signal processors 25 and the plurality of AD converters 26.

The column selection logic 24 selects a column of pixels to output the electric to the plurality of analog signal processors 25.

The plurality of analog signal processors 25 performs predetermined analog signal processing (e.g. frequency filtering, smoothing, etc.) on the electric signal obtained from the plurality of pixels 21 and outputs a processed signal to the plurality of AD converters.

The plurality of AD converters 26 converts the processed signal into digital values (pixel values), thereby generating image data 6. The plurality of AD converters 26 outputs the image data 6.

The visual content extraction unit 10 is configured to generate, based on obtained image data 6, a visual content word sequence 4 indicative for a visual content of an image represented by the obtained image data 6. The visual content extraction unit 10 is implemented as a system-on-a-chip (SoC).

Hence, the visual content word sequence 4 is generated at the time of generating the image data 6.

Then, the image signature for the image represented by the image data 6 is generated by at least one of:

Generating, based on the generated visual content word sequence 4, a visual content signature for the generated visual content word sequence, and adding the generated visual content word sequence 4 and the visual content signature to metadata of the image at 7*a*, as discussed herein.

Adding the generated visual content word sequence 4*a* as a watermark to the image 1*a* at 7*b*, as discussed herein.

Adding the generated visual content word sequence 4*a* to a blockchain at 7*c*, as discussed herein. The generated visual content word sequence 4*a* added to the blockchain is associated with the image 1*a* based on a timestamp or the like.

Figure 7A:
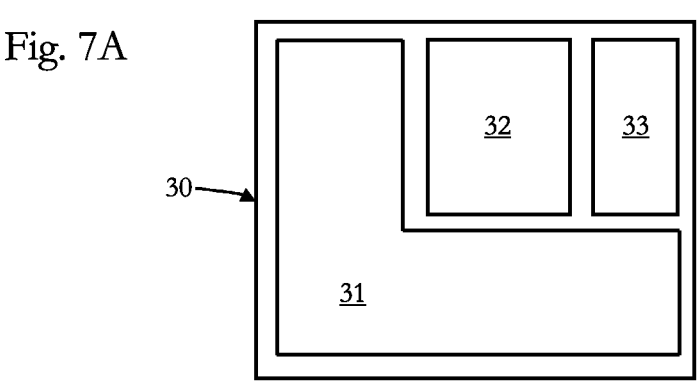
FIG. 7 schematically illustrates embodiments of configurations of an image processing circuitry.
Figure 7B:
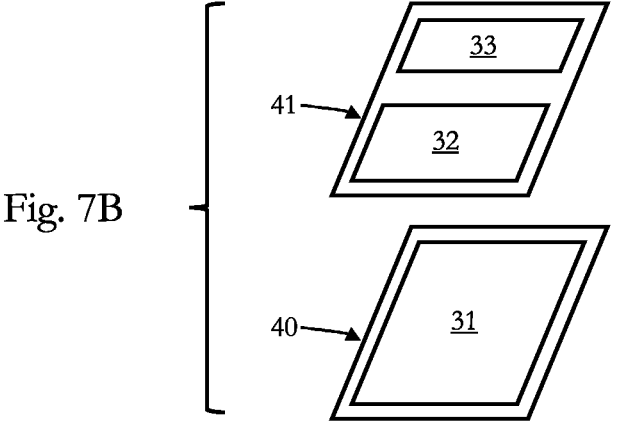
Figure 7C:
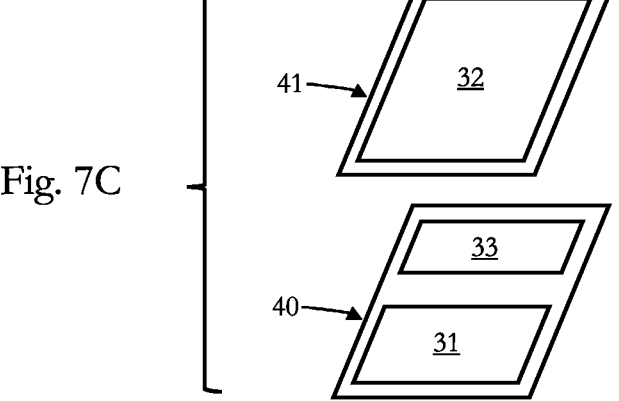

Different embodiments of configurations of an image processing circuitry 30, schematically illustrated in block diagrams, are discussed under reference of FIG. 7A, FIG. 7B and FIG. 7C.

FIG. 7A schematically illustrates an image processing circuitry 30 in a flat configuration on a single semiconductor chip such as, for instance, the image processing circuitry 5 of the embodiment discussed under reference of FIG. 6.

The image processing circuitry includes a logic circuit 31 for signal processing, a pixel circuit 32 and a control unit 33.

The logic circuit 31 includes, for example, the plurality of analog signal processors 25, the plurality of analog-to-digital (AD) converters 26 and the visual content extraction unit 10.

The pixel circuit 32 includes, for example, the plurality of pixels 21, the row selection logic 22 and the column selection logic 24.

The control unit 33 is, for example, the timing control 23.

FIG. 7B schematically illustrates an image processing circuitry 30 in a first stacked configuration. The image processing circuitry 5 of the embodiment discussed under reference of FIG. 6, for example, may be implemented in such a first stacked configuration. The first stacked configuration may correspond to a front-side illuminated image sensor.

In the first stacked configuration, the logic circuit 31, for example, according to the embodiment as discussed under reference of FIG. 7A, is mounted on a first semiconductor chip section 40.

The pixel circuit 32 and the control unit 33, for example, according to the embodiment as discussed under reference of FIG. 7A, are mounted on a second semiconductor chip section 41.

FIG. 7C schematically illustrates an image processing circuitry 30 in a second stacked configuration. The image processing circuitry 5 of the embodiment discussed under reference of FIG. 6, for example, may be implemented in such a second stacked configuration. The second stacked configuration may correspond to a back-side illuminated image sensor.

In the second stacked configuration, the logic circuit 31 and the control unit 33, for example, according to the embodiment as discussed under reference of FIG. 7A, are mounted on the first semiconductor chip section 40.

The pixel circuit 32, for example, according to the embodiment as discussed under reference of FIG. 7A, is mounted on the second semiconductor chip section 41.

It should be recognized that the embodiments of FIG. 7A, FIG. 7B and FIG. 7C describe a flat configuration, a first stacked configuration and a second stacked configuration with an exemplary configuration of the logic circuit 31, the pixel circuit 32 and the control unit 33. The specific configuration of the logic circuit 31, the pixel circuit 32 and the control unit 33 is however given for illustrative purposes only and should not be construed as binding.

FIG. 8 schematically illustrates in a flow diagram an embodiment of an image processing method 100.

At 101, based on obtained image data, a visual content word sequence indicative for a visual content of an image represented by the obtained image data is generated, as discussed herein.

At 102, based on the generated visual content word sequence at 101, an image signature for the image is generated, as discussed herein.

At 103, based on the generated visual content word sequence at 101, a visual content signature for the generated visual content word sequence is generated, as discussed herein.

At 104, the image signature is generated by adding the generated visual content word sequence and the visual content signature to metadata of the image, as discussed herein.

At 105, the image signature is generated by adding the generated visual content word sequence as a watermark to the image, as discussed herein.

At 106, the image signature is generated by adding the generated visual content word sequence to a blockchain, as discussed herein.

At 107, an indication whether the generated visual content word sequence and another visual content word sequence, generated based on obtained another image data, indicative for a visual content of another image represented by the another image data, are identical is output, as discussed herein.

At 108, at least one of the indication, the image together with the generated visual content word sequence and the another image together with the another visual content word sequence is displayed on a display to a user, as discussed herein.

Figure 9:
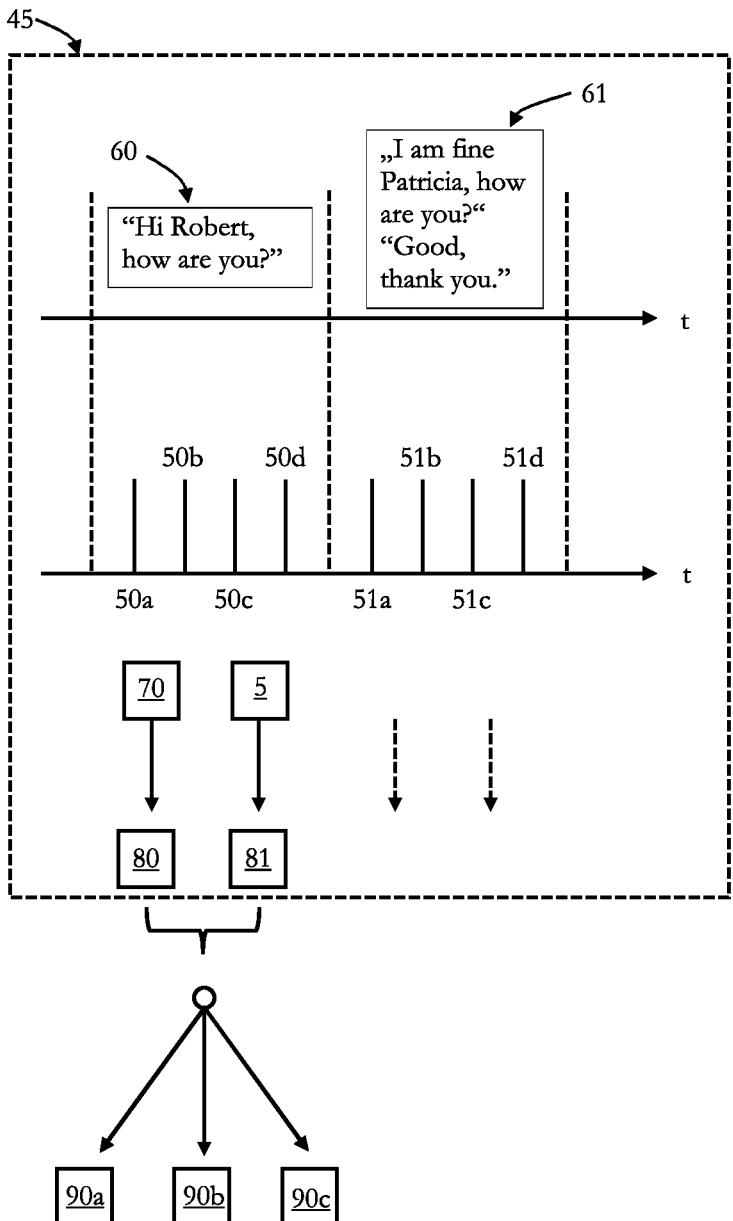
FIG. 9 schematically illustrates in a block diagram an embodiment of a video processing circuitry.

FIG. 9 schematically illustrates in a block diagram an embodiment of a video processing circuitry 45.

The video processing circuitry 45 is embedded in a video processing device (not shown) such as a video camera.

The video processing circuitry 45 includes an audio processing circuitry 70 and an image processing circuitry 5.

A recording of a video is schematically illustrated in two graphs in the block of the video processing circuitry, wherein the horizontal axis is the time axis. The time axis is divided by the dashed vertical lines in regular time intervals illustrating that the video is divided in regular short video sequences.

The upper graph illustrates schematically an audio track (represented by audio data (not shown) obtained from a microphone) of the video by a first dialogue 60 and a second dialogue 61, which are exemplarily for words spoken during a first video sequence and a second video sequence, respectively.

The lower graph schematically illustrates consecutive images 50a-50d and 51a-51d (represented by image data (not shown) obtained from an image sensor) of the video captured according to a frame rate. During the first video sequence the consecutive images 50a-50d are captured and during the second video sequence the consecutive images 51a-51d are captured, respectively.

The audio processing circuitry 70 is configured to extract, from the obtained audio data, a speech word sequence indicative for spoken words in an audio track represented by the obtained audio data.

Accordingly, in the first video sequence, the speech word sequence 80 corresponds to the first dialogue 60 which is "Hi Robert, how are you?".

Accordingly, in the second video sequence, the speech word sequence corresponds to the second dialogue 61 which is "I am fine Patricia, how are you? Good, thank you.".

The image processing circuitry 5 is configured to generate, based on obtained image data, a visual content word sequence for each of the predetermined number of consecutive images represented by the obtained image data.

Accordingly, in the first video sequence, the image processing circuitry 5 generates four visual content word sequences 81 corresponding to the consecutive images 50a-50d.

Accordingly, in the second video sequence, the image processing circuitry 5 generates four visual content word sequences corresponding to the consecutive images 51a-51d.

Then, one image signature for the consecutive images 50a-50d is generated based on the speech word sequence 80 and another image signature for each of the consecutive images 50a-50d is generated based on the visual content word sequences 81 according to the options 90a, 90b and 90c.

The option 90a for generating the image signature corresponds to adding the extracted speech word sequence 80 to metadata of each of the predetermined number of consecutive images 50a-50d and adding the respective generated visual content word sequence 81 to metadata of the respective image.

The option 90b for generating the image signature corresponds to adding the extracted speech word sequence 80 as a watermark to each of the predetermined number of consecutive images 50a-50d and adding the respective generated visual content word sequence 81 as a watermark to the respective image.

The option 90*c* for generating an image signature correspond to adding the extracted speech word sequence 80 and the respective generated visual content word sequence 81 to a blockchain.

The skilled person will appreciate that multiple other combinations for generating the image signature based on the extracted speech word sequence and the visual content word sequence are apparent.

Figure 10:
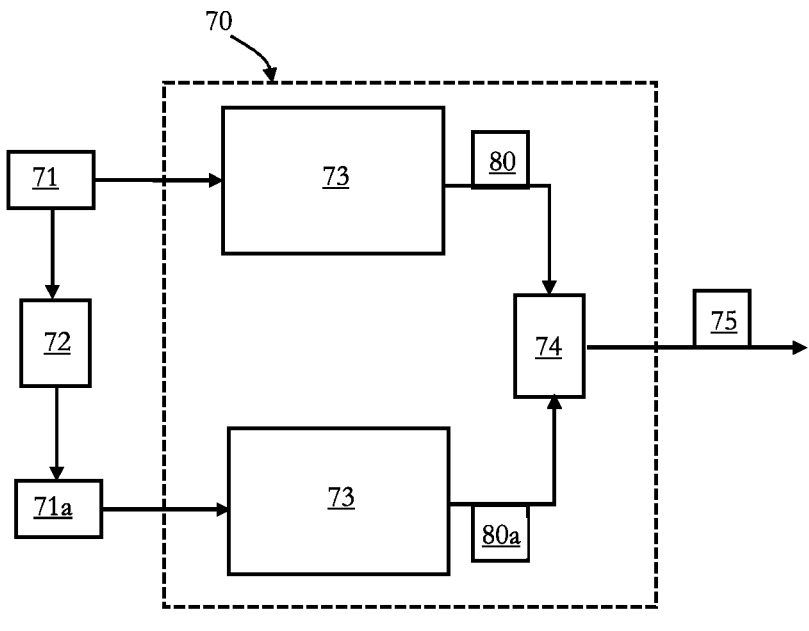
FIG. 10 schematically illustrates in a block diagram an embodiment of an audio processing circuitry included in a video processing circuitry.

FIG. 10 schematically illustrates in a block diagram an embodiment of an audio processing circuitry 70 included in a video processing circuitry.

The audio processing circuitry 70 is embedded in a video processing circuitry (not shown, e.g. the video processing circuitry 45 of FIG. 9) which is embedded in a video processing device (not shown) such as a video camera.

The audio processing circuitry 70 includes an speech extraction unit 73 (shown twice for illustration purposes only) and a comparison unit 74.

The speech extraction unit 73 is configured to generate, from obtained audio data, a speech word sequence indicative for spoken words in an audio track represented by the obtained audio data.

When a user instructs the video camera to record a video, a microphone generates audio data 71 representing the audio track of a video sequence.

Then, the speech extraction unit 73 generates a speech word sequence 80.

The speech word sequence 80 is used for generating one image signature (not shown), as discussed.

Accordingly, the speech word sequence 80 is stored in association with the video.

When the audio data 71 is processed (e.g. filtering, deepfakes, or the like) by an audio processing unit 72, processed audio data 71' is obtained.

Then, the speech extraction unit 73 generates a speech sequence 80' corresponding to the processed audio data 71'.

Then, the comparison unit 74 compares both speech word sequences 70 and 70' and outputs an indication 75 whether they are the same.

If they are different, e.g., in a case of a manipulation of the speech, a user may be notified based on the indication about a possible manipulation.

FIG. 11 schematically illustrates in a flow diagram an embodiment of a video processing method 200.

At 201, from obtained audio data, a speech word sequence indicative for spoken words in an audio track represented by the obtained audio data is extracted, wherein the audio track is associated with a predetermined number of consecutive images of a corresponding video, as discussed herein.

At 202, based on the speech word sequence, one image signature for the predetermined number of consecutive images is generated, as discussed herein.

At 203, the one image signature is generated is generated by at least one of: adding the extracted speech word sequence to metadata of each of the predetermined number of consecutive images, adding the extracted speech word sequence as a watermark to each of the predetermined number of consecutive images, and adding the extracted speech word sequence to a blockchain.

At 204, based on obtained image data, a visual content word sequence for each of the predetermined number of consecutive images represented by the obtained image data is generated, wherein the visual content word sequence is indicative for a visual content of the respective image, as discussed herein.

At 205, based on the respective generated visual content word sequence, another image signature for the respective image is generated, as discussed herein.

At 206, the another image signature is generated by at least one of: adding the respective generated visual content word sequence to metadata of the respective image, adding the respective generated visual content word sequence as a watermark to the respective image, and adding the respective generated visual content word sequence to a blockchain, as discussed herein.

It should be recognized that the embodiments describe methods with an exemplary ordering of method steps. The specific ordering of method steps is however given for illustrative purposes only and should not be construed as binding. For example, the ordering of 105 and 106 in the embodiment of FIG. 8 may be exchanged. Also, the ordering of 201 and 204 in the embodiment of FIG. 11 may be exchanged. Other changes of the ordering of method steps may be apparent to the skilled person.

Please note that the division of the image processing circuitry 5 into units 10 to 12 is only made for illustration purposes and that the present disclosure is not limited to any specific division of functions in specific units. For instance, the image processing circuitry 5 could be implemented by a respective programmed processor, field programmable gate array (FPGA) and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An image processing circuitry configured to:
generate, based on obtained image data, a visual content word sequence indicative for a visual content of an image represented by the obtained image data; and
generate, based on the generated visual content word sequence, an image signature for the image.

(2) The image processing circuitry of (1), wherein the image processing circuitry is further configured to:
generate, based on the generated visual content word sequence, a visual content signature for the generated visual content word sequence, and wherein the image signature is generated by adding the generated visual content word sequence and the visual content signature to metadata of the image.

(3) The image processing circuitry of (1) or (2), wherein the image signature is generated by adding the generated visual content word sequence as a watermark to the image.

(4) The image processing circuitry of anyone of (1) to (3), wherein the image signature is generated by adding the generated visual content word sequence to a blockchain.

(5) The image processing circuitry of anyone of (1) to (4), wherein the image processing circuitry is further configured to:
output an indication whether the generated visual content word sequence and another visual content word sequence, generated based on obtained another image data, indicative for a visual content of another image represented by the another image data, are identical.

(6) The image processing circuitry of (5), wherein at least one of the indication, the image together with the generated visual content word sequence and the another image together with the another visual content word sequence is displayed on a display to a user.

(7) A video processing circuitry configured to:

extract, from obtained audio data, a speech word sequence indicative for spoken words in an audio track represented by the obtained audio data, wherein the audio track is associated with a predetermined number of consecutive images of a corresponding video; and generate, based on the speech word sequence, one image signature for the predetermined number of consecutive images.

(8) The video processing circuitry of (7), wherein the one image signature is generated by at least one of:

adding the extracted speech word sequence to metadata of each of the predetermined number of consecutive images;

adding the extracted speech word sequence as a watermark to each of the predetermined number of consecutive images; and adding the extracted speech word sequence to a blockchain.

(9) The video processing circuitry of (8), wherein the video processing circuitry is further configured to:

generate, based on obtained image data, a visual content word sequence for each of the predetermined number of consecutive images represented by the obtained image data, wherein the visual content word sequence is indicative for a visual content of the respective image; and generate, based on the respective generated visual content word sequence, another image signature for the respective image.

(10) The video processing circuitry of (9), wherein the another image signature for each of the predetermined number of consecutive images is generated by at least one of:

adding the respective generated visual content word sequence to metadata of the respective image;

adding the respective generated visual content word sequence as a watermark to the respective image; and adding the respective generated visual content word sequence to a blockchain.

(11) An image processing method including:

generating, based on obtained image data, a visual content word sequence indicative for a visual content of an image represented by the obtained image data; and generating, based on the generated visual content word sequence, an image signature for the image.

(12) The image processing method of (11), further including:

generating, based on the generated visual content word sequence, a visual content signature for the generated visual content word sequence, and wherein the image signature is generated by adding the generated visual content word sequence and the visual content signature to metadata of the image.

(13) The image processing method of (11) or (12), further including:

generating the image signature by adding the generated visual content word sequence as a watermark to the image.

(14) The image processing method of anyone of (11) to (13), further including:

generating the image signature by adding the generated visual content word sequence to a blockchain.

(15) The image processing method of anyone of (11) to (14), further including:

outputting an indication whether the generated visual content word sequence and another visual content word sequence, generated based on obtained another image data, indicative for a visual content present in another image represented by the another image data, are identical

(16) The image processing method of (15), further including:

displaying at least one of the indication, the image and the another image on a display to a user.

(17) A video processing method including:

extracting, from obtained audio data, a speech word sequence indicative for spoken words in an audio track represented by the obtained audio data, wherein the audio track is associated with a predetermined number of consecutive images of a corresponding video; and generating, based on the speech word sequence, one image signature for the predetermined number of consecutive images.

(18) The video processing method of (17), further including:

generating the one image signature by at least one of:

adding the extracted speech word sequence to metadata of each of the predetermined number of consecutive images;

adding the extracted speech word sequence as a watermark to each of the predetermined number of consecutive images; and adding the extracted speech word sequence to a blockchain.

(19) The video processing method of (18), further including:

generating, based on obtained image data, a visual content word sequence for each of the predetermined number of consecutive images represented by the obtained image data, wherein the visual content word sequence is indicative for a visual content of the respective image; and generating, based on the respective generated visual content word sequence, another image signature for the respective image.

(20) The video processing method of (19), further including:

generating the another image signature for each of the predetermined number of consecutive images by at least one of:

adding the respective generated visual content word sequence to metadata of the respective image;

adding the respective generated visual content word sequence as a watermark to the respective image; and adding the respective generated visual content word sequence to a blockchain.

(21) A computer program comprising program code causing a computer to perform the method according to anyone of (11) to (16), when being carried out on a computer.

(22) A non-transitory computer-readable recording medium that stores therein a computer program product, which, when executed by a processor, causes the method according to anyone of (11) to (16) to be performed.

(23) A computer program comprising program code causing a computer to perform the method according to anyone of (17) to (20), when being carried out on a computer.

(24) A non-transitory computer-readable recording medium that stores therein a computer program product, which, when executed by a processor, causes the method according to anyone of (17) to (20) to be performed.

The invention claimed is:

1. An image processing circuitry configured to:
generate, based on obtained image data, a visual content word sequence indicative for a visual content of an image represented by the obtained image data;
generate, based on the generated visual content word sequence, an image signature for the image;
generate, based on another obtained image data, another visual content word sequence indicative for a visual content of another image represented by the another obtained image data;
compare the visual content word sequence and the another visual content word sequence for at least one manipulation; and
output an alarm indication in response to the comparison between the visual content word sequence and the another visual content word sequence indicating the at least one manipulation.

2. The image processing circuitry according to claim 1, wherein the image processing circuitry is further configured to:
generate, based on the generated visual content word sequence, a visual content signature for the generated visual content word sequence, and wherein the image signature is generated by adding the generated visual content word sequence and the visual content signature to metadata of the image.

3. The image processing circuitry according to claim 1, wherein:
the image signature is generated by adding the generated visual content word sequence as a watermark to the image.

4. The image processing circuitry according to claim 1, wherein;
the image signature is generated by adding the generated visual content word sequence to a blockchain.

5. The image processing circuitry according to claim 1, wherein the image processing circuitry is further configured to:
output an indication whether the generated visual content word sequence and another visual content word sequence, generated based on another obtained image data, indicative for a visual content of another image represented by the another image data, are identical.

6. The image processing circuitry according to claim 5, wherein:
at least one of the indication, the image together with the generated visual content word sequence and the another image together with the another visual content word sequence is displayed on a display to a user.

7. The image processing circuitry according to claim 1, wherein:
the at least one manipulation is caused by artificial intelligence comprising at least one of a generative adversarial network or another deep neural network (DNN).

8. The image processing circuitry according to claim 1, wherein:
the visual content word sequence is generated by a neural network based on a convolutional neural network, a captioning network, an encoder-decoder network, or a long short-term memory (LSTM) network.

9. An image processing method comprising:
generating, based on obtained image data, a visual content word sequence indicative for a visual content of an image represented by the obtained image data;
generating, based on the generated visual content word sequence, an image signature for the image;
generating, based on another obtained image data, another visual content word sequence indicative for a visual content of another image represented by the another obtained image data;
comparing the visual content word sequence and the another visual content word sequence for at least one manipulation; and
outputting an alarm indication in response to the comparison between the visual content word sequence and the another visual content word sequence indicating the at least one manipulation.

10. The image processing method according to claim 9, further comprising:
generating, based on the generated visual content word sequence, a visual content signature for the generated visual content word sequence, and wherein the image signature is generated by adding the generated visual content word sequence and the visual content signature to metadata of the image.

11. The image processing method according to claim 9, further comprising:
generating the image signature by adding the generated visual content word sequence as a watermark to the image.

12. The image processing method according to claim 9, further comprising:
generating the image signature by adding the generated visual content word sequence to a blockchain.

13. The image processing method according to claim 9, further comprising:
outputting an indication whether the generated visual content word sequence and another visual content word sequence, generated based on another obtained image data, indicative for a visual content present in another image represented by the another image data, are identical.

14. The image processing method according to claim 13, further comprising:
displaying at least one of the indication, the image and the another image on a display to a user.

15. The image processing method according to claim 9, wherein:
the at least one manipulation is caused by artificial intelligence comprising at least one of a generative adversarial network or another deep neural network (DNN).

16. The image processing method according to claim 9, wherein:
the visual content word sequence is generated by a neural network based on a convolutional neural network, a captioning network, an encoder-decoder network, or a long short-term memory (LSTM) network.

17. A non-transitory computer-readable recording medium storing instructions configured to cause a processor to perform an image processing method, the method comprising:
generating, based on obtained image data, a visual content word sequence indicative for a visual content of an image represented by the obtained image data;

generating, based on the generated visual content word sequence, an image signature for the image;

generating, based on another obtained image data, another visual content word sequence indicative for a visual content of another image represented by the another obtained image data;

comparing the visual content word sequence and the another visual content word sequence for at least one manipulation; and outputting an alarm indication in response to the comparison between the visual content word sequence and the another visual content word sequence indicating the at least one manipulation.

18. The method according to claim 17, wherein:

the at least one manipulation is caused by artificial intelligence comprising at least one of a generative adversarial network or another deep neural network (DNN).

19. The method according to claim 17, wherein:

the visual content word sequence is generated by a neural network based on a convolutional neural network, a captioning network, an encoder-decoder network, or a long short-term memory (LSTM) network.

20. The method according to claim 17, further comprising:

generating, based on the generated visual content word sequence, a visual content signature for the generated visual content word sequence, and wherein the image signature is generated by adding the generated visual content word sequence and the visual content signature to metadata of the image.

\*   \*   \*   \*   \*